(12) United States Patent
Balasubramanian et al.

(10) Patent No.: US 11,503,573 B2
(45) Date of Patent: Nov. 15, 2022

(54) TECHNIQUES FOR MULTI-USER SUPERPOSITION TRANSMISSION SIDELINK FEEDBACK

(71) Applicant: QUALCOMM Incorporated, San Diego, CA (US)

(72) Inventors: Anantharaman Balasubramanian, San Diego, CA (US); Shuanshuan Wu, San Diego, CA (US); Sudhir Kumar Baghel, Hillsborough, NJ (US); Kapil Gulati, Hillsborough, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 16/947,913

(22) Filed: Aug. 24, 2020

(65) Prior Publication Data
US 2021/0144691 A1 May 13, 2021

Related U.S. Application Data

(60) Provisional application No. 62/933,671, filed on Nov. 11, 2019.

(51) Int. Cl.
*H04W 72/04* (2009.01)
*H04L 1/18* (2006.01)

(52) U.S. Cl.
CPC ....... *H04W 72/0406* (2013.01); *H04L 1/1812* (2013.01)

(58) Field of Classification Search
CPC ... H04W 28/04; H04W 72/04; H04W 72/042; H04W 72/0406; H04W 88/08; H04L 5/0007; H04L 1/1812

(Continued)

(56) References Cited

U.S. PATENT DOCUMENTS

2013/0315124 A1* 11/2013 Rapaport ............... H04W 4/08
370/312
2016/0066337 A1* 3/2016 Sartori ............. H04W 72/0406
370/329

(Continued)

FOREIGN PATENT DOCUMENTS

EP          3952173 A1 * 2/2022 ............. H04L 1/18
WO  WO-2021028387 A1 * 2/2021 ............. H04W 4/16

OTHER PUBLICATIONS

3GPP TSG RAN WG1 Ad-Hoc Meeting 1901, Taipei, Taiwan, Jan. 21-25, 2019, R1-1901146, Agenda item: 7.2.4.1.2, Source: ITL, Title: Discussion on NR V2X HARQ mechanism. (Year: 2019).*

(Continued)

*Primary Examiner* — Pankaj Kumar
*Assistant Examiner* — Sanjay K Dewan
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, on a sidelink, a groupcast communication and a unicast communication concurrently from a transmitter. The UE may determine a feedback sequence to be transmitted to indicate joint acknowledgment or negative acknowledgement feedback for the groupcast communication and the unicast communication based at least in part on a decoding of the groupcast communication. The UE may transmit the feedback sequence in one or more sidelink feedback resources associated with a sidelink subchannel via which at least one of the groupcast communication or the unicast communication is received. Numerous other aspects are provided.

30 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0295624 A1* | 10/2016 | Novlan | H04L 67/12 |
| 2019/0053251 A1* | 2/2019 | Loehr | H04W 72/10 |
| 2019/0182639 A1* | 6/2019 | Basu Mallick | H04W 72/10 |
| 2019/0239112 A1* | 8/2019 | Rao | H04W 72/0406 |
| 2019/0364588 A1* | 11/2019 | Lu | H04W 88/04 |
| 2020/0059915 A1* | 2/2020 | Lee | H04W 72/02 |
| 2020/0112400 A1* | 4/2020 | Lee | H04L 1/1819 |
| 2020/0163005 A1* | 5/2020 | Rao | H04W 76/14 |
| 2020/0220694 A1* | 7/2020 | Khoryaev | H04W 28/04 |
| 2021/0306824 A1* | 9/2021 | Li | H04W 72/1263 |
| 2021/0376967 A1* | 12/2021 | Ahn | H04L 1/1822 |

OTHER PUBLICATIONS

3GPP TSG RAN WG1 Meeting #94bis, Chengdu, China, Oct. 8-12, 2018, R1-1810137, Agenda item: 7.2.4.1.1, Source: Huawei, HiSilicon, Title: Support for sidelink unicast, groupcast and broadcast. (Year: 2018).*
3GPP TSG RAN WG1 # 96bis, Xi'an, China, Apr. 8-12, 2019, R1-1905892, Agenda item: 7.2.4.5, Source: LG Electronics, Title: Feature lead summary #2 for agenda item 7.2.4.5, Physical layer procedures for sidelink. (Year: 2019).*
3GPP TSG RAN WG1 #98bis, Chongqing, China, Oct. 14-20, 2019, R1-1910299, Title: Discussion on PHY procedures for sidelink, Source: ZTE, Sanechips, Agenda item: 7.2.4.5. (Year: 2019).*
Huawei, et al., "Support for Sidelink Unicast, Groupcast and Broad Cast", 3GPP Draft, 3GPP TSG RAN WG1 Meeting #94bis, R1-1810137, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517552, 9 pages, Retrieved from the Internet: URL: http://www.3gpp.org/ftp/tsg%5Fran/WG1%5FRL1/TSGR1%5F94b/Docs/R1%2D1810137%2Ezi p. [retrieved on Sep. 29, 2018] paragraph [0001]—paragraph [0004].
International Search Report and Written Opinion—PCT/US2020/047807—ISA/EPO—dated Nov. 19, 2020.
ITL: "Discussion on NR V2X HARQ Mechanism", 3GPP Draft, 3GPP TSG RAN WG1 Ad-Hoc Meeting 1901, R1-1901146, V2X HARQ Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593990, 5 pages, Retrieved from the Internet: URL: http://www.3gpp.org/ftp/Meetings%5F3GPP%5FSYNC/RAN1/Docs/R1%2D1901146%2Ezip. [retrieved on Jan. 20, 2019] paragraph [0002]—paragraph [0004].
LG Electronics: "Feature lead summary #2 for agenda item 7.2.4.5, Physical layer procedures for sidelink", 3GPP TSG RAN WG1 Meeting #96bis, 3GPP Draft; R1-1905892, Feature Lead Summary of PHT Procedure in NR Sidelink, Rev, 3rd Generation Partnership Project (3GPP), Mobile Competence Centre ; 650, Route Des Lucioles ; F-06921 Sophia-Anti Poli, val. RAN WG1, No. Xi'an, China; Apr. 8, 2019-Apr. 12, 2019, Apr. 15, 2019 (Apr. 15, 2019), 23 Pages, XP051707935, Retrieved from the Internet: URL: http://www.3gpp.org/ftp/tsg%5Fran/WG1%5FRL1/TSGR1%5F96b/Docs/R1%2D1905892%2Ezi p. [retrieved on Apr. 15, 2019].
ZTE: et al., "Discussion on PHY Procedures for Sidelink", 3GPP Draft, 3GPP TSG RAN WG1 #98bis, R1-1910299, Discussion on PHY Procedures for Sidelink, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 6, 2019 (Oct. 6, 2019), XP051808902, 11 pages, Retrieved from the Internet: URL: https://ftp.3gpp.org/tsg_ran/WG1_RL1/TSGR1_98b/Docs/R1-1910299.zip. R1-1910299 Discussion on PHY procedures for sidelink .docx [retrieved on Oct. 6, 2019] paragraph [0002]—paragraph [0004].

* cited by examiner

TECHNIQUES FOR MULTI-USER SUPERPOSITION TRANSMISSION SIDELINK FEEDBACK

CROSS-REFERENCE TO RELATED APPLICATION

This patent application claims priority to U.S. Provisional Patent Application No. 62/933,671, filed on Nov. 11, 2019, entitled "TECHNIQUES FOR MULTI-USER SUPERPOSITION TRANSMISSION SIDELINK FEEDBACK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multi-user superposition transmission sidelink feedback.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving, on a sidelink, a groupcast communication and a unicast communication concurrently from a transmitter; determining a feedback sequence to be transmitted to indicate joint acknowledgment (ACK) or negative acknowledgement (NACK) feedback for the groupcast communication and the unicast communication based at least in part on a decoding of the groupcast communication; and transmitting the feedback sequence in one or more sidelink feedback resources associated with a sidelink subchannel via which at least one of the groupcast communication or the unicast communication is received.

In some aspects, a UE for wireless communication may include a memory and one or more processors coupled to the memory. The memory and the one or more processors may be configured to: receive, on a sidelink, a groupcast communication and a unicast communication concurrently from a transmitter; determine a feedback sequence to be transmitted to indicate joint ACK or NACK feedback for the groupcast communication and the unicast communication based at least in part on a decoding of the groupcast communication; and transmit the feedback sequence in one or more sidelink feedback resources associated with a sidelink subchannel via which at least one of the groupcast communication or the unicast communication is received.

In some aspects, a non-transitory computer-readable medium may store one or more instructions for wireless communication. The one or more instructions, when executed by one or more processors of a UE, may cause the one or more processors to: receive, on a sidelink, a groupcast communication and a unicast communication concurrently from a transmitter; determine a feedback sequence to be transmitted to indicate joint ACK or NACK feedback for the groupcast communication and the unicast communication based at least in part on a decoding of the groupcast communication; and transmit the feedback sequence in one or more sidelink feedback resources associated with a sidelink subchannel via which at least one of the groupcast communication or the unicast communication is received.

In some aspects, an apparatus for wireless communication may include: means for receiving, on a sidelink, a groupcast communication and a unicast communication concurrently from a transmitter; means for determining a feedback sequence to be transmitted to indicate joint ACK or NACK feedback for the groupcast communication and the unicast communication based at least in part on a decoding of the groupcast communication; and means for transmitting the feedback sequence in one or more sidelink feedback resources associated with a sidelink subchannel via which at least one of the groupcast communication or the unicast communication is received.

In some aspects, the groupcast communication and the unicast communication are concurrently received from the transmitter in different sidelink subchannels.

In some aspects, the groupcast communication and the unicast communication are concurrently received from the transmitter in a single sidelink subchannel.

In some aspects, the one or more sidelink feedback resources are associated with the single sidelink subchannel.

In some aspects, sidelink control information (SCI) indicates that the groupcast communication and the unicast communication are superposition coded in the single sidelink subchannel.

In some aspects, the SCI includes a stage one SCI message and a stage two SCI message that are superposition coded in a sidelink control channel.

In some aspects, the feedback sequence to be transmitted is determined based at least in part on a cyclic shift of a base sequence.

In some aspects, the feedback sequence is a first feedback sequence if the decoding of the groupcast communication is successful and a decoding of the unicast communication is successful, a second feedback sequence if the decoding of the groupcast communication is successful and a decoding of the unicast communication is unsuccessful, or a third feedback sequence if the decoding of the groupcast communication is unsuccessful.

In some aspects, the one or more sidelink feedback resources include a first sidelink feedback resource configured for ACK feedback if the feedback sequence is the first feedback sequence or the second feedback sequence, or a second sidelink feedback resource configured for NACK feedback if the feedback sequence is the third feedback sequence.

In some aspects, the one or more sidelink feedback resources are identified based at least in part on the decoding of the groupcast communication.

In some aspects, the one or more sidelink feedback resources are identified based at least in part on a first port identifier used for the groupcast communication or a second port identifier used for the unicast communication.

In some aspects, the one or more sidelink feedback resources include a common sidelink feedback resource for NACK-only groupcast feedback and for ACK or NACK unicast feedback.

In some aspects, the UE receives an indication of a transmit power control parameter for transmission of the ACK or NACK unicast feedback, and transmits the feedback sequence in the common sidelink feedback resource based at least in part on the transmit power control parameter.

In some aspects, the one or more sidelink feedback resources include a first sidelink feedback resource used for NACK-only groupcast feedback and a second sidelink feedback resource used for ACK or NACK unicast feedback.

In some aspects, the second sidelink feedback resource is based at least in part on the first sidelink feedback resource.

In some aspects, a method of wireless communication, performed by a UE, may include: receiving a groupcast communication and a unicast communication concurrently from a transmitter via a single sidelink subchannel; transmitting groupcast feedback including an ACK or a NACK for the groupcast communication in a first sidelink feedback resource that is based at least in part on a first parameter used to receive the groupcast communication; and transmitting unicast feedback including an ACK or a NACK for the unicast communication in a second sidelink feedback resource that is based at least in part on a second parameter used to receive the unicast communication, wherein the second parameter is different from the first parameter.

In some aspects, a UE for wireless communication may include a memory and one or more processors coupled to the memory. The memory and the one or more processors may be configured to: receive a groupcast communication and a unicast communication concurrently from a transmitter via a single sidelink subchannel; transmit groupcast feedback including an ACK or a NACK for the groupcast communication in a first sidelink feedback resource that is based at least in part on a first parameter used to receive the groupcast communication; and transmit unicast feedback including an ACK or a NACK for the unicast communication in a second sidelink feedback resource that is based at least in part on a second parameter used to receive the unicast communication, wherein the second parameter is different from the first parameter.

In some aspects, a non-transitory computer-readable medium may store one or more instructions for wireless communication. The one or more instructions, when executed by one or more processors of a UE, may cause the one or more processors to: receive a groupcast communication and a unicast communication concurrently from a transmitter via a single sidelink subchannel; transmit groupcast feedback including an ACK or a NACK for the groupcast communication in a first sidelink feedback resource that is based at least in part on a first parameter used to receive the groupcast communication; and transmit unicast feedback including an ACK or a NACK for the unicast communication in a second sidelink feedback resource that is based at least in part on a second parameter used to receive the unicast communication, wherein the second parameter is different from the first parameter.

In some aspects, an apparatus for wireless communication may include: means for receiving a groupcast communication and a unicast communication concurrently from a transmitter via a single sidelink subchannel; means for transmitting groupcast feedback including an ACK or a NACK for the groupcast communication in a first sidelink feedback resource that is based at least in part on a first parameter used to receive the groupcast communication; and means for transmitting unicast feedback including an ACK or a NACK for the unicast communication in a second sidelink feedback resource that is based at least in part on a second parameter used to receive the unicast communication, wherein the second parameter is different from the first parameter.

In some aspects, the first sidelink feedback resource is determined based at least in part on the single sidelink subchannel, a transmitter identifier of the transmitter, and the first parameter, and the second sidelink feedback resource is determined based at least in part on the single sidelink subchannel, the transmitter identifier, and the second parameter.

In some aspects, the first parameter includes a first port identifier and the second parameter includes a second port identifier.

In some aspects, the first sidelink feedback resource is a first physical resource block (PRB), the second sidelink feedback resource is a second PRB that is different from and at least partially overlaps in time with the first PRB.

In some aspects, the first sidelink feedback resource and the second sidelink feedback resource include a single sidelink feedback resource in which the groupcast feedback and the unicast feedback are code-division multiplexed.

In some aspects, SCI indicates that the groupcast communication and the unicast communication are superposition coded in the single sidelink subchannel.

In some aspects, the SCI includes a stage one SCI message and a stage two SCI message that are superposition coded in a sidelink control channel.

In some aspects, a method of wireless communication, performed by a UE, may include: transmitting, on a sidelink, a groupcast communication and a unicast communication concurrently to a receiver; receiving a feedback sequence from the receiver in one or more sidelink feedback resources associated with a sidelink sub channel via which at least one of the groupcast communication or the unicast communication is transmitted; and interpreting the feedback sequence based at least in part on a mapping between a set of feedback sequences and corresponding joint acknowledgment or negative acknowledgement feedback for the groupcast communication and the unicast communication.

In some aspects, a UE for wireless communication may include a memory and one or more processors coupled to the memory. The memory and the one or more processors may be configured to: transmit, on a sidelink, a groupcast communication and a unicast communication concurrently to a receiver; receive a feedback sequence from the receiver in one or more sidelink feedback resources associated with a sidelink subchannel via which at least one of the groupcast communication or the unicast communication is transmitted; and interpret the feedback sequence based at least in part on a mapping between a set of feedback sequences and corresponding joint acknowledgment or negative acknowledgement feedback for the groupcast communication and the unicast communication.

In some aspects, a non-transitory computer-readable medium may store one or more instructions for wireless communication. The one or more instructions, when executed by one or more processors of a UE, may cause the one or more processors to: transmit, on a sidelink, a groupcast communication and a unicast communication concurrently to a receiver; receive a feedback sequence from the receiver in one or more sidelink feedback resources associated with a sidelink subchannel via which at least one of the groupcast communication or the unicast communication is transmitted; and interpret the feedback sequence based at least in part on a mapping between a set of feedback sequences and corresponding joint acknowledgment or negative acknowledgement feedback for the groupcast communication and the unicast communication.

In some aspects, an apparatus for wireless communication may include: means for transmitting, on a sidelink, a groupcast communication and a unicast communication concurrently to a receiver; means for receiving a feedback sequence from the receiver in one or more sidelink feedback resources associated with a sidelink subchannel via which at least one of the groupcast communication or the unicast communication is transmitted; and means for interpreting the feedback sequence based at least in part on a mapping between a set of feedback sequences and corresponding joint acknowledgment or negative acknowledgement feedback for the groupcast communication and the unicast communication.

In some aspects, the groupcast communication and the unicast communication are concurrently transmitted to the receiver in different sidelink subchannels.

In some aspects, the groupcast communication and the unicast communication are concurrently transmitted to the receiver in a single sidelink subchannel.

In some aspects, SCI indicates that the groupcast communication and the unicast communication are superposition coded in the single sidelink subchannel.

In some aspects, the SCI includes a stage one SCI message and a stage two SCI message that are superposition coded in a sidelink control channel.

In some aspects, a method of wireless communication, performed by a UE, may include: transmitting a groupcast communication and a unicast communication concurrently to a receiver via a single sidelink subchannel; receiving groupcast feedback including an ACK or a NACK for the groupcast communication in a first sidelink feedback resource that is based at least in part on a first parameter used to transmit the groupcast communication; and receiving unicast feedback including an ACK or a NACK for the unicast communication in a second sidelink feedback resource that is based at least in part on a second parameter used to transmit the unicast communication, wherein the second parameter is different from the first parameter.

In some aspects, a UE for wireless communication may include a memory and one or more processors coupled to the memory. The memory and the one or more processors may be configured to: transmit a groupcast communication and a unicast communication concurrently to a receiver via a single sidelink subchannel; receive groupcast feedback including an ACK or a NACK for the groupcast communication in a first sidelink feedback resource that is based at least in part on a first parameter used to transmit the groupcast communication; and receive unicast feedback including an ACK or a NACK for the unicast communication in a second sidelink feedback resource that is based at least in part on a second parameter used to transmit the unicast communication, wherein the second parameter is different from the first parameter.

In some aspects, a non-transitory computer-readable medium may store one or more instructions for wireless communication. The one or more instructions, when executed by one or more processors of a UE, may cause the one or more processors to: transmit a groupcast communication and a unicast communication concurrently to a receiver via a single sidelink subchannel; receive groupcast feedback including an ACK or a NACK for the groupcast communication in a first sidelink feedback resource that is based at least in part on a first parameter used to transmit the groupcast communication; and receive unicast feedback including an ACK or a NACK for the unicast communication in a second sidelink feedback resource that is based at least in part on a second parameter used to transmit the unicast communication, wherein the second parameter is different from the first parameter.

In some aspects, an apparatus for wireless communication may include: means for transmitting a groupcast communication and a unicast communication concurrently to a receiver via a single sidelink subchannel; means for receiving groupcast feedback including an ACK or a NACK for the groupcast communication in a first sidelink feedback resource that is based at least in part on a first parameter used to transmit the groupcast communication; and means for receiving unicast feedback including an ACK or a NACK for the unicast communication in a second sidelink feedback resource that is based at least in part on a second parameter used to transmit the unicast communication, wherein the second parameter is different from the first parameter.

In some aspects, SCI indicates that the groupcast communication and the unicast communication are superposition coded in the single sidelink subchannel.

In some aspects, the SCI includes a stage one SCI message and a stage two SCI message that are superposition coded in a sidelink control channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
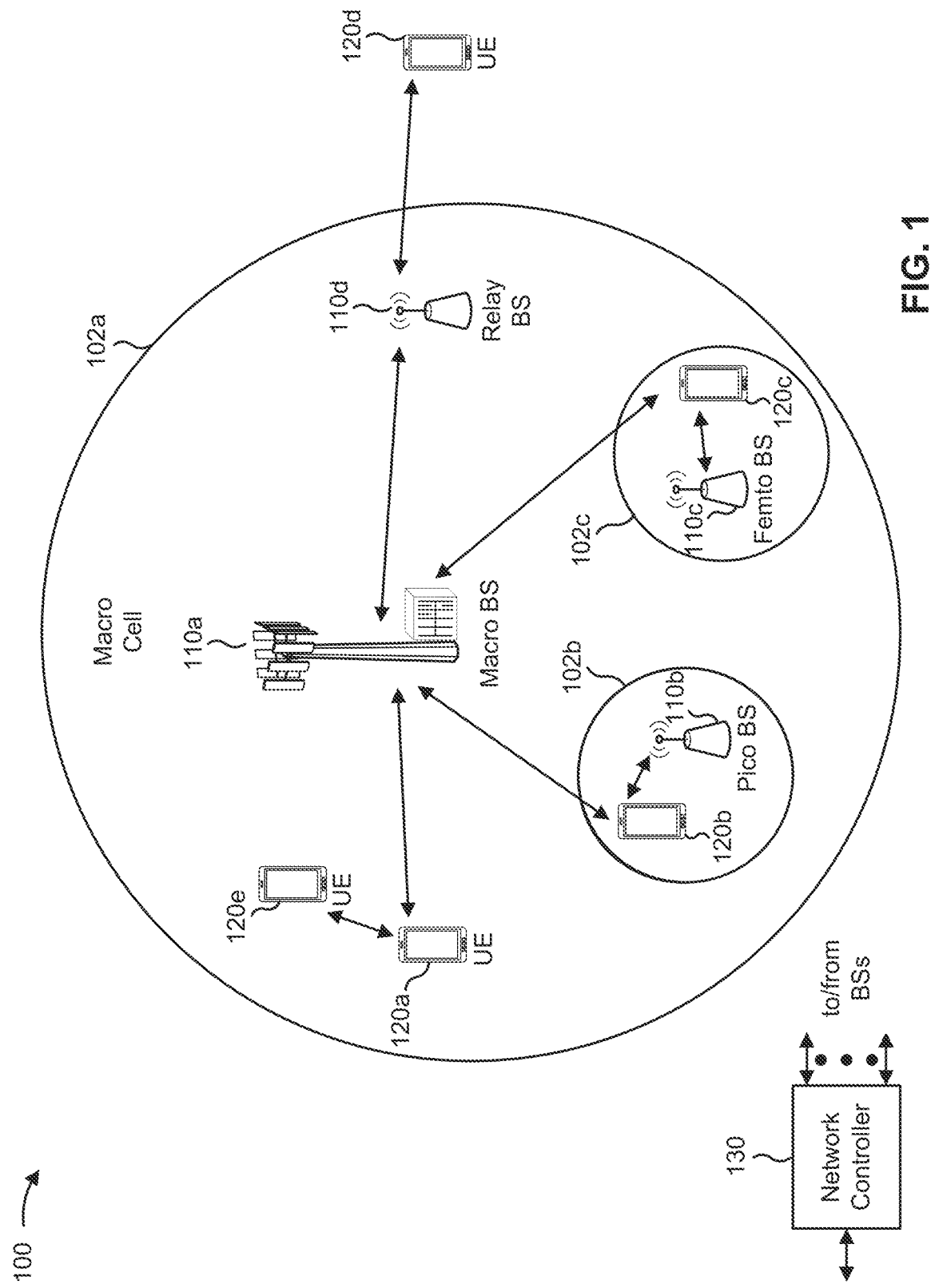
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
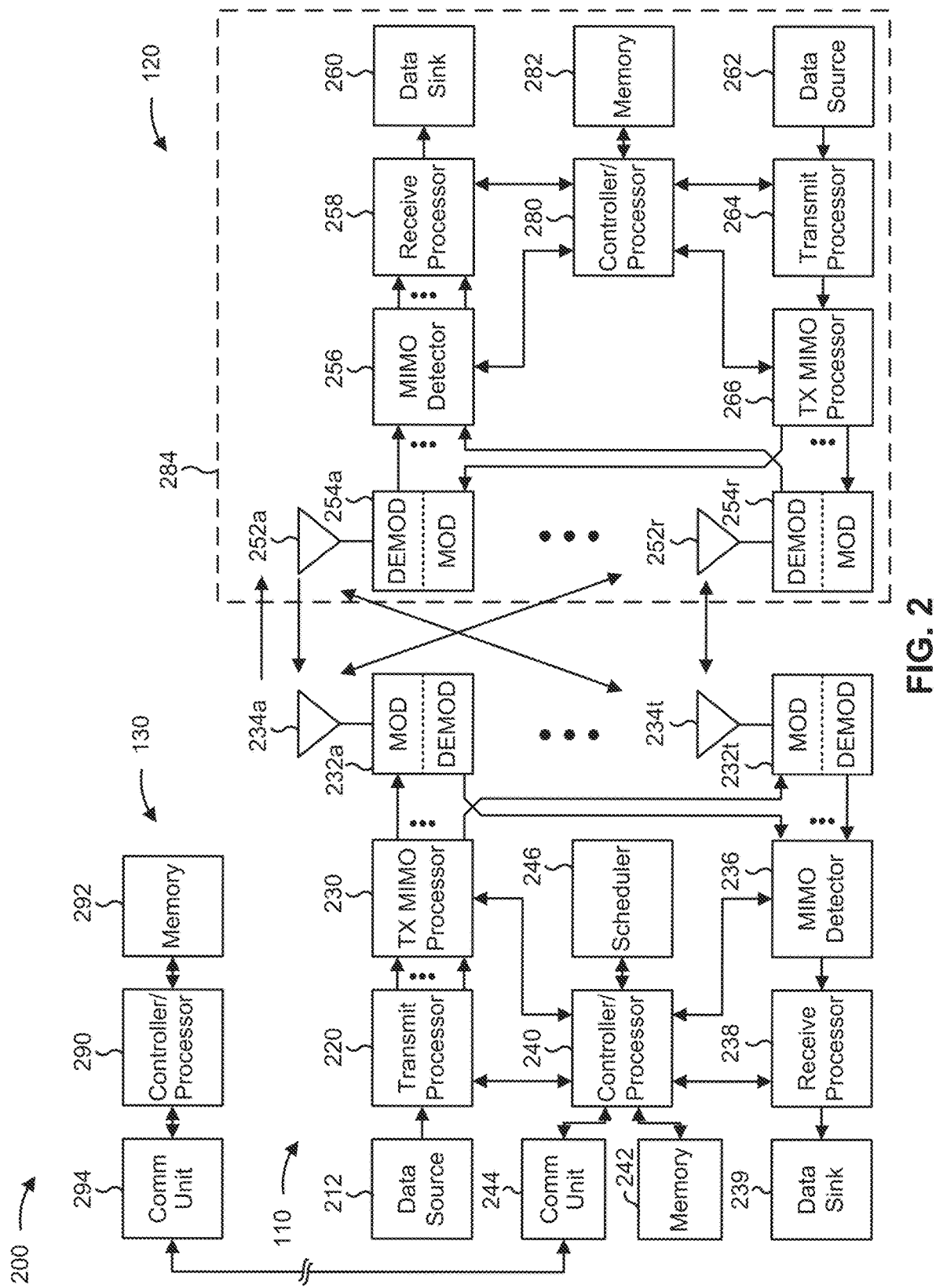
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with multi-user superposition transmission sidelink feedback, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, UE 120 may include means for receiving, on a sidelink, a groupcast communication and a unicast communication concurrently from a transmitter UE 120, means for determining a feedback sequence to be transmitted to indicate joint ACK or NACK feedback for the groupcast communication and the unicast communication based at least in part on a decoding of the groupcast communication, means for transmitting the feedback sequence in one or more sidelink feedback resources associated with a sidelink subchannel via which at least one of the groupcast communication or the unicast communication is received, and/or the like.

Additionally, or alternatively, UE 120 may include means for receiving a groupcast communication and a unicast communication concurrently from a transmitter UE 120 via a single sidelink subchannel, means for transmitting groupcast feedback including an ACK or a NACK for the groupcast communication in a first sidelink feedback resource that is based at least in part on a first parameter used to receive the groupcast communication, means for transmitting unicast feedback including an ACK or a NACK for the unicast communication in a second sidelink feedback resource that is based at least in part on a second parameter used to receive the unicast communication, and/or the like.

Additionally, or alternatively, UE 120 may include means for transmitting, on a sidelink, a groupcast communication and a unicast communication concurrently to a receiver UE 120, means for receiving a feedback sequence from the receiver UE 120 in one or more sidelink feedback resources associated with a sidelink subchannel via which at least one of the groupcast communication or the unicast communication is transmitted, means for interpreting the feedback sequence based at least in part on a mapping between a set of feedback sequences and corresponding joint acknowledgment or negative acknowledgement feedback for the groupcast communication and the unicast communication, and/or the like.

Additionally, or alternatively, UE 120 may include means for transmitting a groupcast communication and a unicast communication concurrently to a receiver UE 120 via a single sidelink subchannel, means for receiving groupcast feedback including an ACK or a NACK for the groupcast communication in a first sidelink feedback resource that is based at least in part on a first parameter used to transmit the groupcast communication, means for receiving unicast feedback including an ACK or a NACK for the unicast communication in a second sidelink feedback resource that is based at least in part on a second parameter used to transmit the unicast communication, and/or the like.

In some aspects, any one or more of such means described above may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
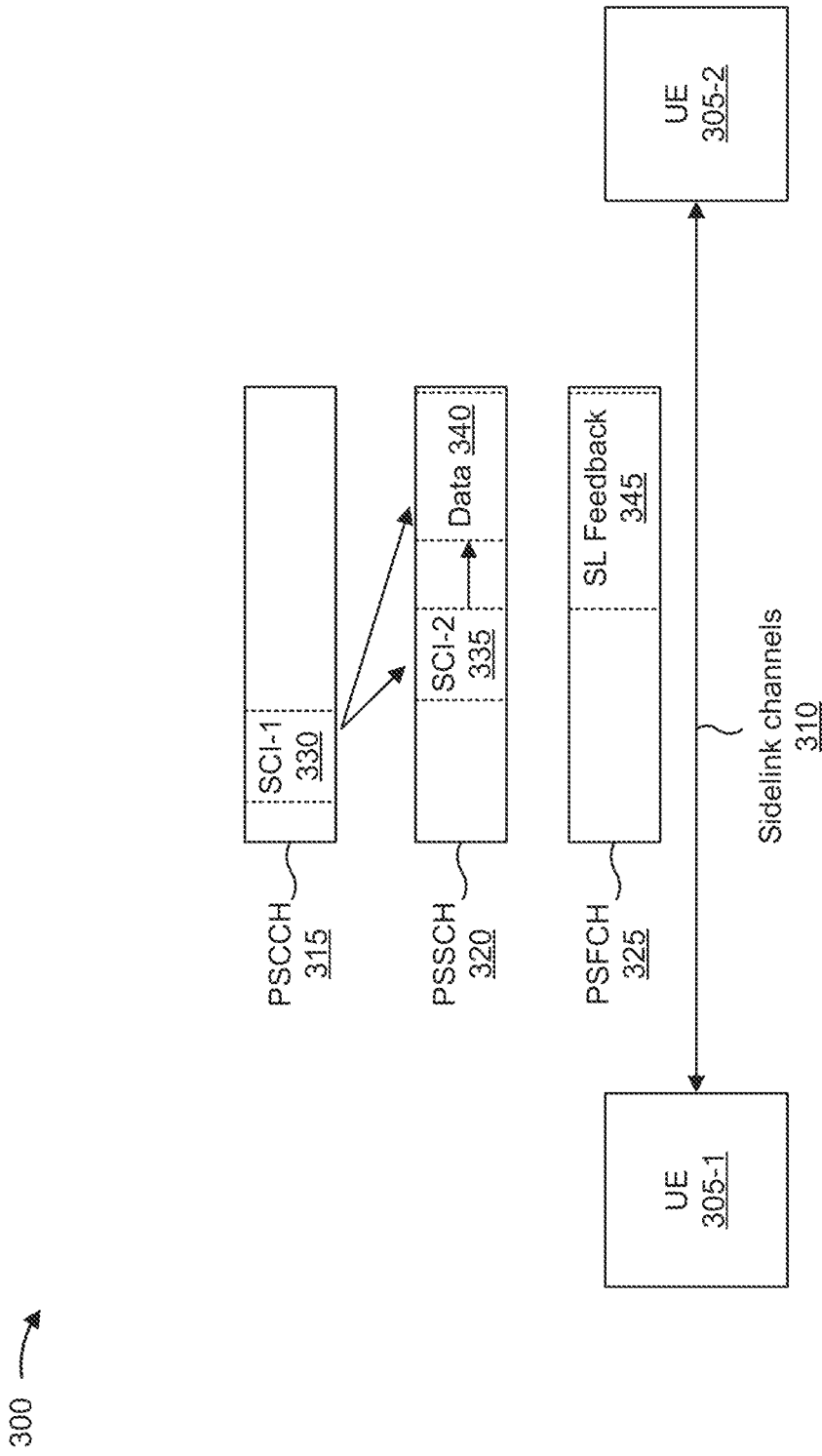
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

In some aspects, the PSCCH 315 may carry sidelink control information (SCI), which may indicate various control information used for sidelink communications. For example, in some aspects, the SCI may include a stage one SCI (SCI-1) 330, which may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, an SCI format and a beta offset for stage two sidelink control information (SCI-2) 335 transmitted on the PSSCH 320, a quantity of PSSCH DMRS ports, a modulation coding scheme (MCS), and/or the like.

In some aspects, the information carried on the PSSCH 320 may include the SCI-2 335 and/or data 340. The SCI-2 335 may include various types of information, such as a HARQ process ID, a new data indicator (NDI) associated with the data 340 carried on the PSSCH 320, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

In some aspects, the PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
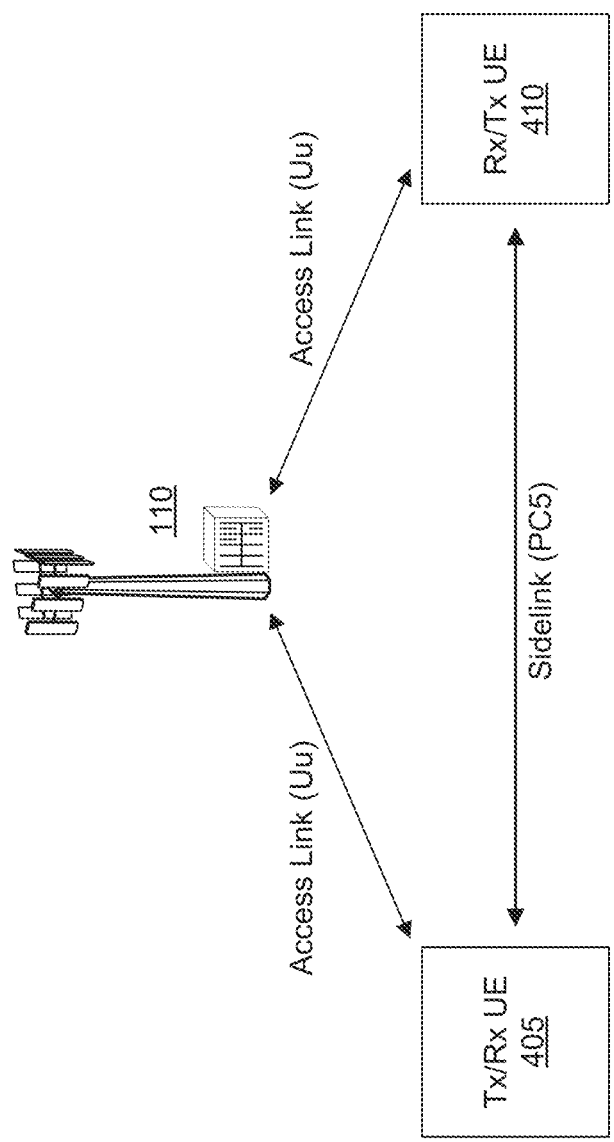
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx/Rx UE 405 and the Rx/Tx UE 410 may operate in a resource allocation mode in which the base station 110 reserves and allocates sidelink resources for the Tx/Rx UE 405 and the Rx/Tx UE 410. This may be referred to as Mode 1 sidelink resource allocation. In some aspects, the Tx/Rx UE 405 and the Rx/Tx UE 410 may operate in a resource allocation mode in which sidelink resource selection and/or scheduling is performed by the Tx/Rx UE 405 and/or the Rx/Tx UE 410 (e.g., rather than the base station 110). This may be referred to as Mode 2 sidelink resource allocation.

In a Mode 2 sidelink resource allocation scheme, the base station 110 may transmit a sidelink grant to the Tx/Rx UE 405 and/or the Rx/Tx UE 410 via the access link. The sidelink grant may be a dynamic grant (e.g., received in a downlink control information (DCI) communication) or a semi-static/configured grant (e.g., received in a radio resource control (RRC) communication). For semi-static/configured grants, the base station 110 may activate a sidelink grant in the same RRC communication that configures the sidelink grant (referred to as a Type 1 configured grant) or may activate the sidelink grant in a DCI communication (referred to as a Type 2 configured grant).

As indicated above, FIG. 4 is provided as an example. Other examples may differ from what is described with respect to FIG. 4.

As described above, in some cases, two or more UEs may communicate with each other using sidelink signals. Real-world applications of sidelink communications may include public safety, proximity services, UE-to-network relaying, vehicle-to-everything (V2X) communications, Internet of Everything (IoE) communications, IoT communications, mission-critical mesh, and/or various other suitable applications. Generally, "sidelink signal" may refer to a signal communicated from one subordinate entity (e.g., a transmitter UE) to another subordinate entity (e.g., a receiver UE) without relaying that communication through a scheduling entity (e.g., another UE or base station), even though the scheduling entity may be utilized for scheduling and/or control purposes. In some cases, a receiver UE may provide, to a transmitter UE, feedback associated with a sidelink communication that was received from the transmitter UE on a sidelink between the receiver UE and the transmitter UE. For example, the feedback may include hybrid automatic repeat request (HARQ) feedback, such as an acknowledgement (ACK) or a negative acknowledgement (NACK). In general, the receiver UE may transmit the feedback in one or more HARQ feedback communications. For example, the sidelink may include a frame structure that has various slots, and each slot in the frame structure may include one or more HARQ feedback reporting symbols that may be used for transmitting the HARQ feedback.

In some cases, sidelink communications may include one or more groupcast (or multicast) sessions, where the transmitter UE transmits the same groupcast communication(s) to each receiver UE in a receiver set that may include one or more receiver UEs. Additionally, or alternatively, sidelink communications may include one or more unicast sessions, where the transmitter UE transmits a unicast communication to an individual receiver UE. For example, the transmitter UE may use separate sidelink subchannels to transmit the groupcast communication and the unicast communication. Additionally, or alternatively, the sidelink may support a higher-order modulation technique that enables superposition coding, such as multi-user superposition transmission (MUST), whereby the transmitter UE may concurrently or jointly transmit the groupcast communication and the unicast communication via a single sidelink subchannel (e.g., to improve spectral efficiency).

Accordingly, as described herein, the receiver UE may concurrently receive the groupcast communication and the unicast communication from the transmitter UE via the single sidelink subchannel, or via separate subchannels. However, this additional flexibility may create ambiguity in operation of a feedback channel (e.g., a physical sidelink feedback channel (PSFCH)) used to transmit HARQ feedback for the groupcast communication and the unicast communication. For example, in existing techniques, resources (e.g., physical resource blocks (PRBs)) used to transmit sidelink feedback are generally determined according to the resources used for the data channel, which may include separate subchannels for the groupcast communication and the unicast communication, a single subchannel for both the groupcast communication and the unicast communication in cases where superposition coding is used, and/or the like.

Some aspects described herein provide techniques and apparatuses to coordinate sidelink feedback in cases where a transmitter UE uses superposition coding to transmit a groupcast communication to receivers in a receiver set while concurrently transmitting a unicast communication to one or more receivers in the receiver set (e.g., via a separate unicast subchannel or a joint groupcast and unicast subchannel). For example, in some aspects, a receiver UE that receives both the groupcast communication and the unicast communication may determine joint feedback for the groupcast communication and the unicast communication, and the receiver UE may transmit the joint feedback to the transmitter UE using a resource that the receiver UE selects according to an outcome from decoding the groupcast communication. Alternatively, in some aspects, the receiver UE may determine individual feedback for the groupcast communication and the unicast communication, and the receiver UE may transmit the individual feedback to the transmitter UE using separate resources reserved for groupcast feedback and unicast feedback. Additionally, or alternatively, in some aspects, NACK-only feedback may be used for the groupcast communication while ACK/NACK feedback is used for the unicast communication to reduce a number of ACK messages communicated over the feedback channel.

Figure 5A:
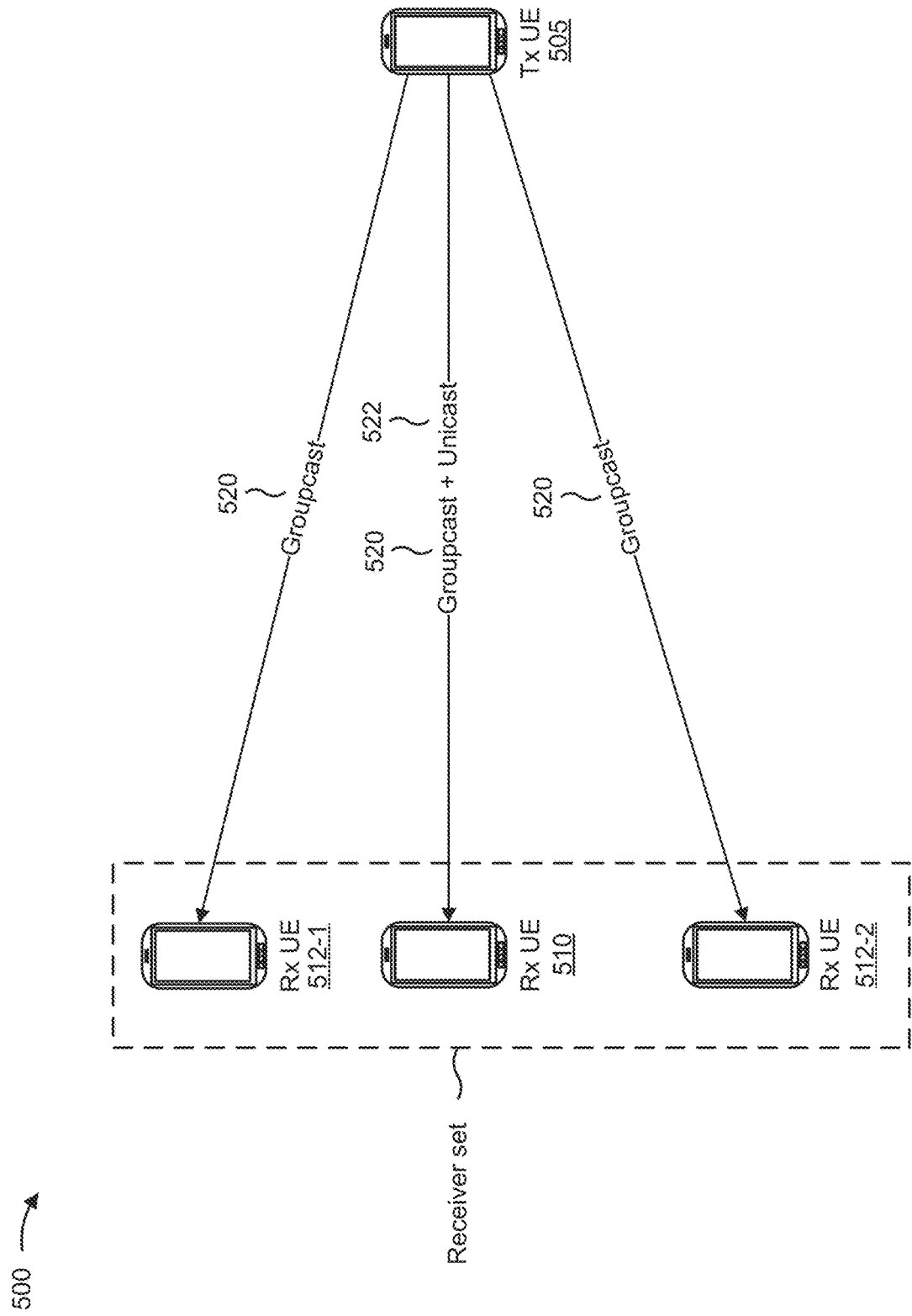
FIGS. 5A-5C are diagrams illustrating examples associated with multi-user superposition transmission sidelink feedback, in accordance with various aspects of the present disclosure.
Figure 5B:
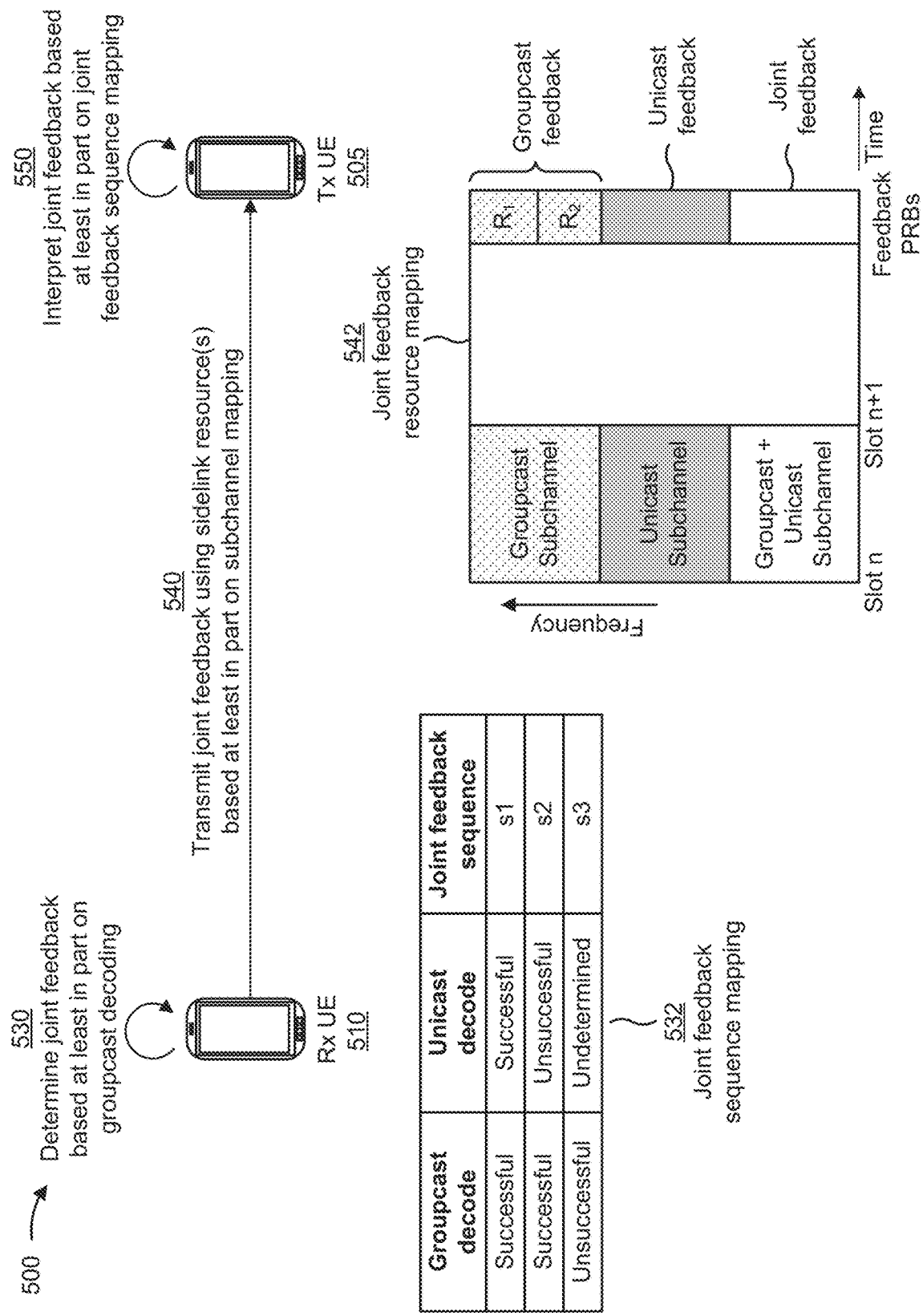
Figure 5C:
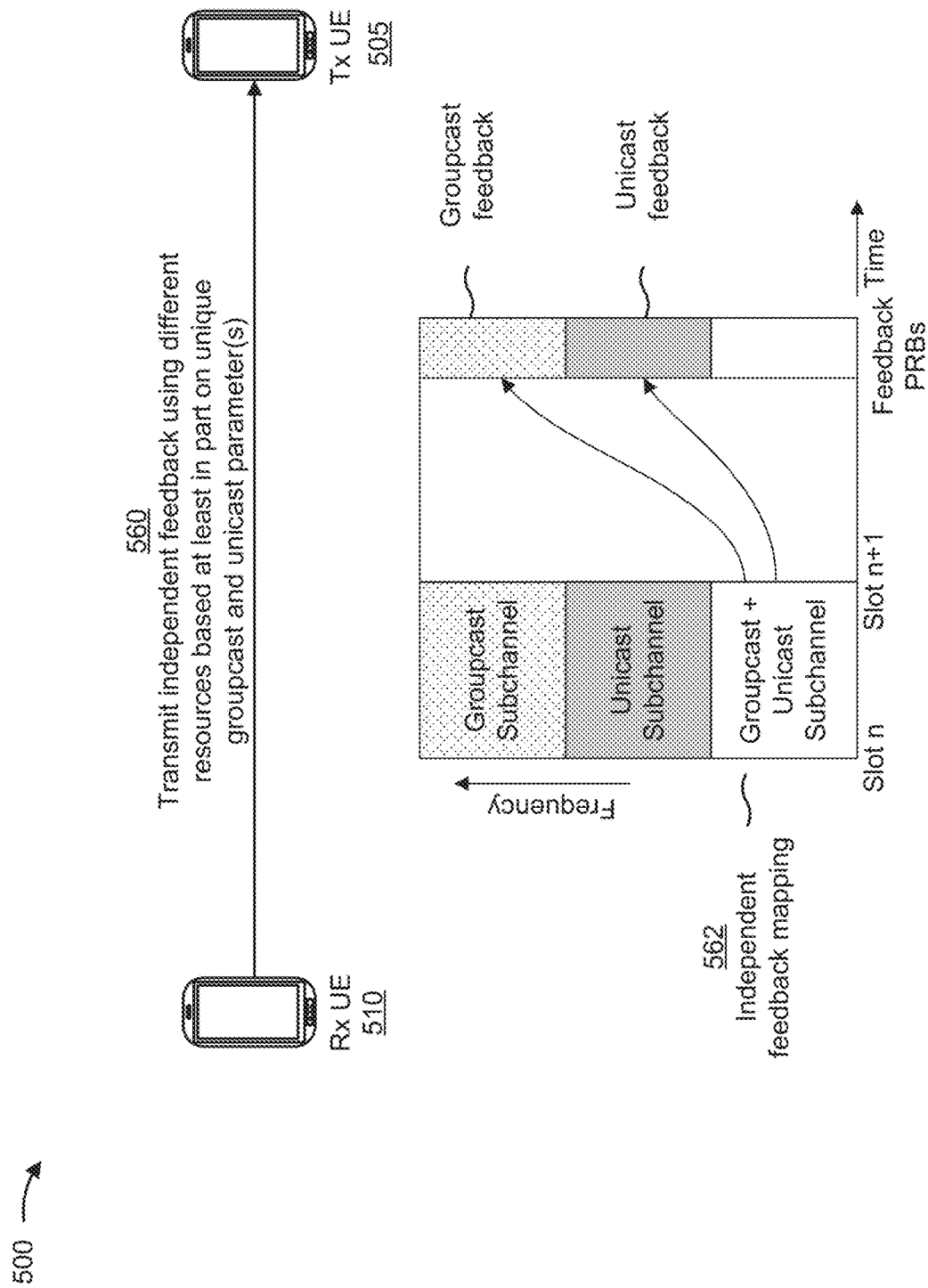

FIGS. 5A-5C are diagrams illustrating one or more examples 500 of MUST sidelink feedback, in accordance with various aspects of the present disclosure. As shown in FIGS. 5A-5C, examples 500 include a transmitter UE 505 communicating on a sidelink with a receiver set that includes receiver UEs 510, 512-1, 512-2.

As shown in FIG. 5A, and by reference number 520, each receiver UE in the receiver set (e.g., the receiver UE 510 and the receiver UEs 512-1, 512-2) may receive a groupcast communication from the transmitter UE. Furthermore, as shown by reference number 522, the receiver UE 510 may receive a unicast communication from the transmitter UE 505. For example, in some aspects, the receiver UE 510 may concurrently receive the groupcast communication and the unicast communication via separate subchannels. Additionally, or alternatively, in some aspects, the receiver UE 510 may concurrently receive the groupcast communication and the unicast communication via a single (joint) subchannel. For example, as described above, the sidelink may support a higher-order modulation technique that enables superposition coding, such as MUST, whereby the transmitter UE 505 may concurrently or jointly transmit the groupcast communication and the unicast communication via a single sidelink subchannel to improve spectral efficiency, reduce interference, and/or the like. As described in further detail herein, the receiver UE 510 may use various techniques to determine and/or transmit feedback for the groupcast communication and the unicast communication to the transmitter UE 505.

For example, as shown in FIG. 5B, and by reference number 530, the receiver UE 510 may determine joint feedback for the groupcast communication and the unicast communication based at least in part on a decoding of the groupcast communication. For example, in some aspects, the receiver UE 510 may be configured to attempt to decode the groupcast communication first, and to further attempt to decode the unicast communication only if the groupcast communication is successfully decoded. In some cases, a dependency between the unicast communication and the groupcast communication (e.g., information enabling the receiver UE 510 to decode the unicast communication after successfully decoding the groupcast communication) may be indicated in sidelink control information (SCI) provided to the receiver UE 510. For example, in some aspects, the SCI may explicitly or implicitly indicate whether multiple transmissions (e.g., the groupcast communication and the unicast communication) are superposition coded for joint transmission, joint feedback, and/or the like. Furthermore, in some aspects, the information enabling the receiver UE 510 to decode the unicast communication may include a layer 1 (L1) source identifier associated with the unicast communication and/or the like.

In some aspects, in cases where the groupcast communication and the unicast communication are superposition coded for joint transmission, joint feedback, and/or the like, the groupcast communication may be transmitted as a base layer to be received by each UE in the receiver set, and the unicast communication that is specific to only the receiver UE 510 may be transmitted as a superposition layer (sometimes referred to as an enhancement layer and/or the like). In this way, the sidelink resources that the transmitter UE 505 uses to transmit the groupcast communication to all of the UEs in the receiver set may be reused to transmit the unicast communication to the receiver UE 510. Accordingly, in some aspects, the SCI transmitted by the transmitter UE 505 may indicate whether a message includes a single layer (e.g., the base layer only) or multiple layers (e.g., the base layer and the superposition layer). In other words, the SCI that the transmitter UE 505 transmits to each UE in the receiver set may indicate the presence or absence of an additional superposition layer unicasted to the respective UE.

For example, to indicate to the receiver UE 510 that a message transmitted over the sidelink channel includes a groupcast communication and a unicast communication that are superposition coded for joint transmission, information associated with the additional superposition layer may be indicated to the receiver UE 510 in a stage one SCI (SCI-1) message or a stage two (SCI-2) message. For example, as described above, the SCI-1 message is generally carried over a PSCCH, is used to indicate a channel use or resource reservation, and is blindly decoded by all UEs in the receiver set. The SCI-1 message may also contain a pointer to an SCI-2 message, which is a UE-specific message carried over a PSSCH to indicate additional parameters, such as a transmitter identifier, a receiver identifier, an MCS, HARQ control information associated with a transport block transmitted over the PSSCH, and/or the like. Accordingly, in some aspects, the transmitter UE 505 may broadcast or multicast the SCI-1 message to each receiver UE in the receiver set to indicate control information for the groupcast communication, and may transmit an SCI-2 message to individual UEs (e.g., receiver UEs 510, 512, and/or the like) to further indicate UE-specific information, such as the presence or absence of a superposition layer.

Accordingly, in some aspects, the receiver UE 510 may process the SCI transmitted by the transmitter UE 510 to determine whether a data transmission from the transmitter 510 includes multiple messages (e.g., a groupcast communication and a unicast communication) that are superposition coded for joint transmission (e.g., using the same resource). For example, in some aspects, the SCI-2 message may be transmitted using superposition (e.g., using the same PSCCH resource as the SCI-1 message), whereby the receiver UE 510 may determine whether the additional superposition (unicast) layer is present in the PSSCH based at least in part on the presence or absence of the SCI-2 message. Additionally, or alternatively, the presence or absence of the superposition layer may be indicated directly in the SCI-1 message. For example, the receiver UE 510 may decode the base (groupcast) layer to determine whether to yield or acquire a medium (e.g., a sidelink channel) based on a priority level that indicates whether the medium is available (e.g., unoccupied by other transmitters). Furthermore, in cases where the receiver UE 510 determines to acquire the medium, the receiver UE 510 may perform a contention procedure for the additional superposition layer using a priority indication in the superposition layer of the SCI. In this way, various parameters related to the superposition (unicast) layer may be signaled in the SCI-2 message that is superposition coded with the SCI-1 message.

As shown by reference 532, the joint feedback for the groupcast communication and the unicast communication may include a feedback sequence that indicates joint ACK or joint NACK feedback for the groupcast communication and the unicast communication based at least in part on a decoding of the groupcast communication. For example, in cases where the groupcast communication is successfully decoded, the receiver UE 510 may then attempt to decode the unicast communication, which may be successfully or unsuccessfully decoded. Alternatively, in cases where the groupcast communication is not decoded successfully, the unicast decoding may have an undetermined status (e.g., because the receiver UE 510 can attempt to decode the unicast communication only if the groupcast communication is successfully decoded). Accordingly, in some aspects, the joint feedback may include a first sequence (s1) if decoding of the groupcast communication is successful and decoding of the unicast communication is successful, a second sequence (s2) if decoding of the groupcast communication is successful and decoding of the unicast communication is unsuccessful, or a third sequence (s3) if decoding of the groupcast communication is unsuccessful.

For example, the first sequence may indicate an ACK for the groupcast communication and an ACK for the unicast communication, the second sequence may indicate an ACK for the groupcast communication and a NACK for the unicast communication, and the third sequence may indicate only a NACK for the groupcast communication (which may be an implicit NACK for the unicast communication). In general, the joint feedback sequence to be transmitted may be determined by applying a cyclic shift to a base sequence, and each receiver UE in the receiver set that receives the groupcast communication may be configured to transmit different independent sequences (e.g., to differentiate feedback from the various receiver UEs).

As further shown in FIG. 5B, and by reference number 540, the receiver UE 510 may transmit the joint feedback for the groupcast communication and the unicast communication using one or more sidelink resources that are based at least in part on a subchannel mapping associated with the groupcast communication and/or the unicast communication. For example, as shown by reference number 542, the receiver UE 510 may use a configured mapping between the subchannel used for joint groupcast and unicast transmission to identify a physical resource block (PRB) for the joint feedback, and the joint feedback may be transmitted to the transmitter UE 505 via the PRB for the joint feedback. Additionally, or alternatively, in some aspects, the receiver UE 510 may select a groupcast feedback resource to transmit the joint feedback. For example, as shown in FIG. 5B, each receiver UE in the receiver set may be provided with or implicitly determine a first feedback resource ($R_1$) to transmit a groupcast ACK and a second feedback resource ($R_2$) to transmit a groupcast NACK.

Accordingly, in order to transmit the joint feedback that may indicate groupcast and unicast decoding outcomes, the receiver UE 510 may select the feedback resource to transmit the joint feedback according to the groupcast decoding outcome. For example, the receiver UE 505 may transmit the joint feedback using the first resource configured for the groupcast ACK if the joint feedback includes the first sequence or the second sequence (e.g., the joint feedback is a sequence that jointly indicates a groupcast ACK and either a unicast ACK or a unicast NACK).

Alternatively, the receiver UE 505 may transmit the joint feedback using the second resource configured for the groupcast NACK if the joint feedback includes the third sequence (e.g., the joint feedback is a sequence that indicates a groupcast NACK and an undetermined status or implicit NACK for unicast).

As further shown in FIG. 5B, and by reference number 550, the transmitter UE 505 may receive the joint feedback via the sidelink resource(s) used by the receiver UE 510 and interpret the joint feedback based at least in part on the mapping between the set of feedback sequences (e.g., s1, s2, s3) and corresponding joint ACK or NACK feedback. For example, the transmitter UE 505 may interpret the joint feedback as an ACK for the groupcast communication and an ACK for the unicast communication if the first feedback sequence (s1) is received, as an ACK for the groupcast communication and a NACK for the unicast communication if the second feedback sequence (s2) is received, or as a NACK for the groupcast communication if the third feedback sequence (s3) is received.

As shown in FIG. 5C, and by reference number 560, the receiver UE 510 may alternatively determine independent feedback for the groupcast communication and the unicast communication and transmit the independent feedback using different feedback resources based at least in part on one or more parameters that are unique among the groupcast communication and the unicast communication. For example, in some aspects, a mapping to the feedback resources used to transmit the independent feedback may be different for the groupcast communication and the unicast communication despite the groupcast communication and the unicast communication having identical transmitter identifiers and identical subchannel numbers (e.g., in cases where the groupcast communication and the unicast communication are superposition coded for joint transmission via a single subchannel).

Accordingly, in some aspects, a port identifier may be used as the parameter(s) to provide a unique mapping from a single subchannel to two unique feedback resources (e.g., a first PRB for the groupcast feedback and a second PRB for the unicast feedback), as the transmitter UE 505 may use distinct ports to transmit the groupcast communication and the unicast communication in the same subchannel. Accordingly, as shown by reference number 562, the receiver UE 510 may determine the sidelink feedback resource for the groupcast feedback based at least in part on the subchannel used to jointly transmit the groupcast communication and the unicast communication, an identifier of the transmitter UE 505, and a first port identifier associated with the groupcast communication. Furthermore, the receiver UE 510 may determine the sidelink feedback resource for the unicast feedback based at least in part on the subchannel used to jointly transmit the groupcast communication and the unicast communication, the identifier of the transmitter UE 505, and a second port identifier associated with the unicast communication. Furthermore, as shown, the sidelink feedback resource for the groupcast feedback and the sidelink feedback resource for the unicast feedback may be separate PRBs that at least partially overlap in time. Additionally, or alternatively, in cases where there are resource constraints, a single feedback resource may be used, and the groupcast feedback and the unicast feedback may be code-division multiplexed within the single feedback resource.

In some aspects, in the joint feedback technique described above with reference to FIG. 5B, the independent feedback technique described above with reference to FIG. 5C, and/or the like, NACK-only feedback may be configured for the groupcast communication and ACK/NACK feedback may be configured for the unicast communication. For example, in some aspects, a common resource may be provided for groupcast feedback from all receiver UEs in the receiver set, and a given receiver UE (e.g., receiver UEs 510, 512-1, 512-2, and/or the like) may transmit NACK feedback only. In other words, if a given receiver UE successfully decodes the groupcast communication, the receiver UE does not transmit any groupcast feedback.

In some aspects, when NACK-only feedback is configured for the groupcast communication, the common feedback resource provided for groupcast feedback from all receiver UEs may also be used for unicast feedback from the receiver UE 510 that concurrently receives the groupcast communication and the unicast communication from the transmitter UE 505. In this case, there may be one or more UEs transmitting a groupcast NACK on the common resource while the receiver UE 510 is transmitting unicast ACK/NACK feedback on the common resource. Accordingly, in some aspects, the receiver UE 510 may receive an indication of a transmit power control parameter for transmitting the unicast ACK/NACK feedback on the common resource. For example, the transmit power control parameter may cause the receiver UE 510 to boost a transmit power used for the unicast feedback in order to enable the transmitter UE 505 to reliably receive and detect the unicast feedback (e.g., because other UEs may be transmitting groupcast feedback using the same resource). In some aspects, the transmit power control parameter may have a value that depends on the number of receiver UEs receiving the groupcast communication. For example, in cases where there are a large number of receiver UEs receiving the groupcast communication, a larger transmit power boost may be configured for the receiver UE 510 to ensure that the transmitter UE 505 can reliably receive the unicast feedback when there may be many UEs transmitting groupcast feedback on the same resource.

Alternatively, in some aspects, a common feedback resource may be provided for groupcast feedback from all receiver UEs, and a separate resource may be reserved for unicast feedback from the receiver UE 510 that concurrently receives the groupcast communication and the unicast communication. In this case, the receiver 510 may implicitly determine the separate resource reserved for the unicast feedback based at least in part on the common feedback resource provided for the groupcast feedback from all receiver UEs. For example, in some aspects, the unicast feedback resource may be determined as (groupcast NACK resource+1) mod N, where N is a number of PRBs allocated to sidelink feedback. In this way, by providing a separate resource that is reserved for unicast feedback, the receiver UE 510 may avoid applying an increase in transmit power for the unicast feedback, which reduces energy consumption, reduces interference, reduces signaling overhead, and/or the like.

As indicated above, FIGS. 5A-5C are provided as one or more examples. Other examples may differ from what is described with respect to FIGS. 5A-5C.

Figure 6:
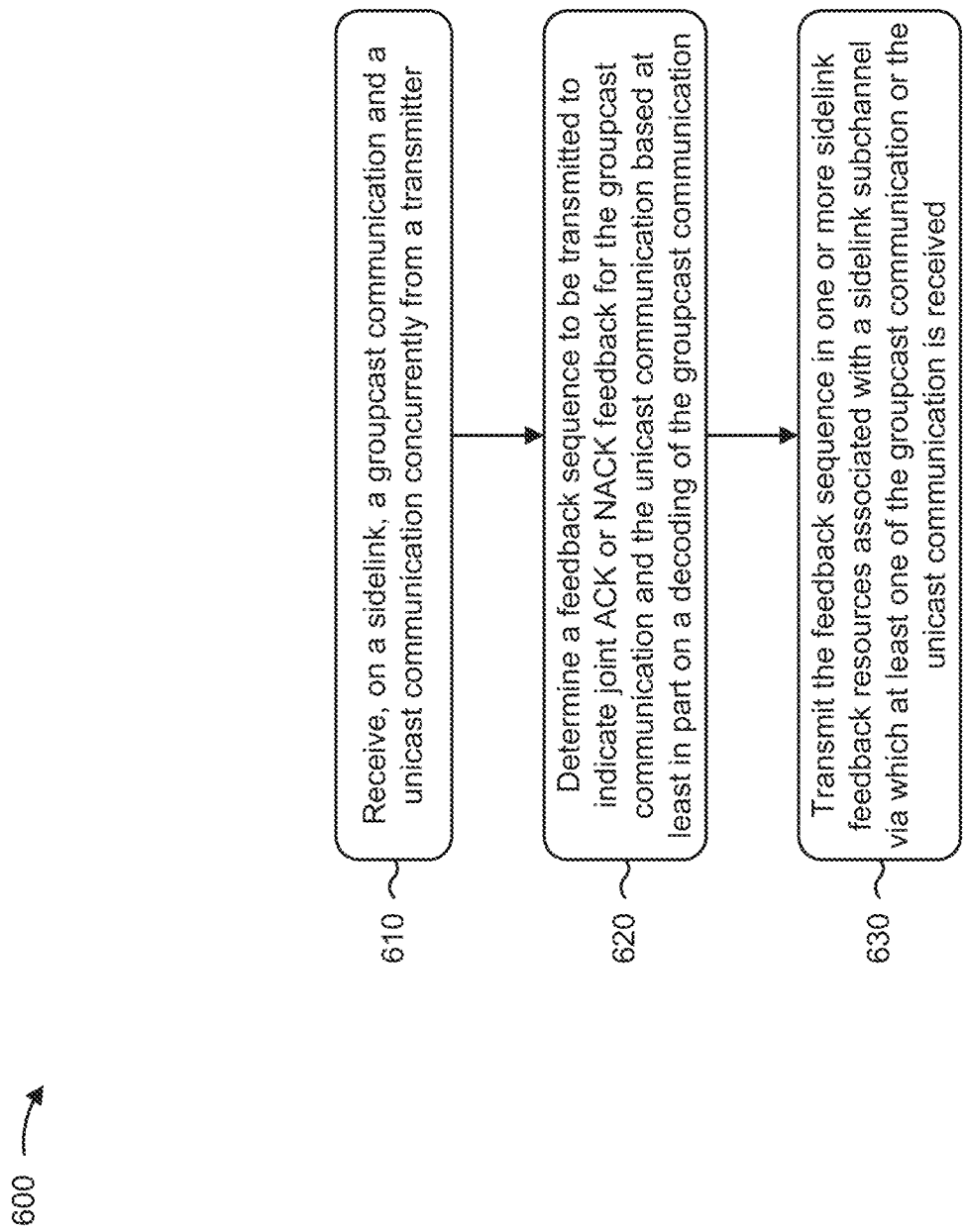
FIGS. 6-9 are diagrams illustrating example processes associated with multi-user superposition transmission sidelink feedback, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, UE 305, Tx/Rx UE 405, Rx/Tx UE 410, UE 510, and/or the like) performs operations associated with transmitting MUST sidelink feedback.

As shown in FIG. 6, in some aspects, process 600 may include receiving, on a sidelink, a groupcast communication and a unicast communication concurrently from a transmitter (block 610). For example, the UE may receive (e.g., using antenna 252, DEMOD 254, MIMO detector 256, receive processor 258, controller/processor 280, and/or the like), on a sidelink, a groupcast communication and a unicast communication concurrently from a transmitter, as described above.

As further shown in FIG. 6, in some aspects, process 600 may include determining a feedback sequence to be transmitted to indicate joint ACK or NACK feedback for the groupcast communication and the unicast communication based at least in part on a decoding of the groupcast communication (block 620). For example, the UE may determine (e.g., using controller/processor 280 and/or the like) a feedback sequence to be transmitted to indicate joint ACK or NACK feedback for the groupcast communication and the unicast communication based at least in part on a decoding of the groupcast communication, as described above.

As further shown in FIG. 6, in some aspects, process 600 may include transmitting the feedback sequence in one or more sidelink feedback resources associated with a sidelink subchannel via which at least one of the groupcast communication or the unicast communication is received (block 630). For example, the UE may transmit (e.g., using controller/processor 280, transmit processor 264, TX MIMO processor 266, MOD 254, antenna 252, and/or the like) the feedback sequence in one or more sidelink feedback resources associated with a sidelink subchannel via which at least one of the groupcast communication or the unicast communication is received, as described above.

Process 600 may include additional aspects, such as any single aspect or any combination of aspects described below and/or in connection with one or more other processes described elsewhere herein.

In a first aspect, the groupcast communication and the unicast communication are concurrently received from the transmitter in different sidelink subchannels.

In a second aspect, alone or in combination with the first aspect, the groupcast communication and the unicast communication are concurrently received from the transmitter in a single sidelink subchannel.

In a third aspect, alone or in combination with one or more of the first and second aspects, the one or more sidelink feedback resources are associated with the single sidelink subchannel.

In a fourth aspect, alone or in combination with one or more of the first through third aspects, process 600 includes receiving SCI indicating that the groupcast communication and the unicast communication are superposition coded in the single sidelink subchannel.

In a fifth aspect, alone or in combination with one or more of the first through fourth aspects, the SCI includes an SCI-1 message and an SCI-2 message that are superposition coded in a sidelink control channel.

In a sixth aspect, alone or in combination with one or more of the first through fifth aspects, the feedback sequence to be transmitted is determined based at least in part on a cyclic shift of a base sequence.

In a seventh aspect, alone or in combination with one or more of the first through sixth aspects, the feedback sequence is a first feedback sequence if the decoding of the groupcast communication is successful and a decoding of the unicast communication is successful, a second feedback sequence if the decoding of the groupcast communication is successful and a decoding of the unicast communication is unsuccessful, or a third feedback sequence if the decoding of the groupcast communication is unsuccessful.

In an eighth aspect, alone or in combination with one or more of the first through seventh, the one or more sidelink feedback resources include a first sidelink feedback resource configured for ACK feedback if the feedback sequence is the first feedback sequence or the second feedback sequence, or a second sidelink feedback resource configured for NACK feedback if the feedback sequence is the third feedback sequence.

In a ninth aspect, alone or in combination with one or more of the first through eighth aspects, the one or more sidelink feedback resources are identified based at least in part on the decoding of the groupcast communication.

In a tenth aspect, alone or in combination with one or more of the first through ninth aspects, the one or more sidelink feedback resources are identified based at least in part on a first port identifier used for the groupcast communication or a second port identifier used for the unicast communication.

In an eleventh aspect, alone or in combination with one or more of the first through tenth aspects, the one or more sidelink feedback resources include a common sidelink feedback resource for NACK-only groupcast feedback and for ACK or NACK unicast feedback.

In a twelfth aspect, alone or in combination with one or more of the first through eleventh aspects, process 600 may further include receiving an indication of a transmit power control parameter for transmission of the ACK or NACK unicast feedback, and transmitting the feedback sequence in the common sidelink feedback resource based at least in part on the transmit power control parameter.

In a thirteenth aspect, alone or in combination with one or more of the first through twelfth aspects, the one or more sidelink feedback resources include a first sidelink feedback resource used for NACK-only groupcast feedback and a second sidelink feedback resource used for ACK or NACK unicast feedback.

In a fourteenth aspect, alone or in combination with one or more of the first through thirteenth aspects, the second sidelink feedback resource is based at least in part on the first sidelink feedback resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
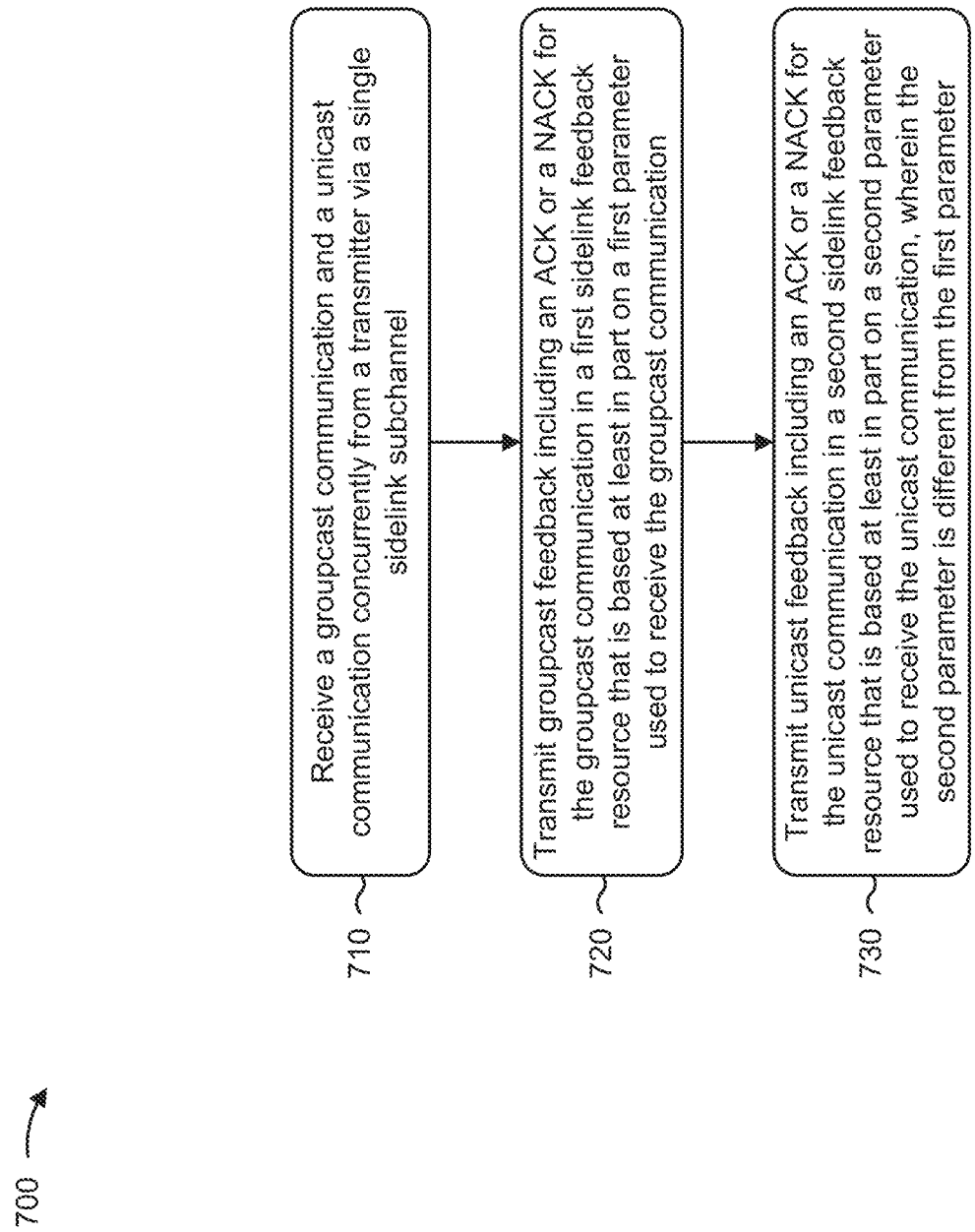

FIG. 7 is a diagram illustrating an example process 700 performed, for example, by a UE, in accordance with various aspects of the present disclosure. Example process 700 is an example where a UE (e.g., UE 120, UE 305, Tx/Rx UE 405, Rx/Tx UE 410, UE 510, and/or the like) performs operations associated with transmitting MUST sidelink feedback.

As shown in FIG. 7, in some aspects, process 700 may include receiving a groupcast communication and a unicast communication concurrently from a transmitter via a single sidelink subchannel (block 710). For example, the UE may receive (e.g., using antenna 252, DEMOD 254, MIMO detector 256, receive processor 258, controller/processor 280, and/or the like) a groupcast communication and a unicast communication concurrently from a transmitter via a single sidelink subchannel, as described above.

As further shown in FIG. 7, in some aspects, process 700 may include transmitting groupcast feedback including an ACK or a NACK for the groupcast communication in a first sidelink feedback resource that is based at least in part on a first parameter used to receive the groupcast communication (block 720). For example, the UE may transmit (e.g., using controller/processor 280, transmit processor 264, TX MIMO processor 266, MOD 254, antenna 252, and/or the like) groupcast feedback including an ACK or a NACK for the groupcast communication in a first sidelink feedback resource that is based at least in part on a first parameter used to receive the groupcast communication, as described above.

As further shown in FIG. 7, in some aspects, process 700 may include transmitting unicast feedback including an ACK or a NACK for the unicast communication in a second sidelink feedback resource that is based at least in part on a second parameter used to receive the unicast communication, wherein the second parameter is different from the first parameter (block 730). For example, the UE may transmit (e.g., using controller/processor 280, transmit processor 264, TX MIMO processor 266, MOD 254, antenna 252, and/or the like) unicast feedback including an ACK or a NACK for the unicast communication in a second sidelink feedback resource that is based at least in part on a second parameter used to receive the unicast communication, as described above. In some aspects, the second parameter is different from the first parameter.

Process 700 may include additional aspects, such as any single aspect or any combination of aspects described below and/or in connection with one or more other processes described elsewhere herein.

In a first aspect, the first sidelink feedback resource is determined based at least in part on the single sidelink subchannel, a transmitter identifier of the transmitter, and the first parameter, and the second sidelink feedback resource is determined based at least in part on the single sidelink subchannel, the transmitter identifier, and the second parameter.

In a second aspect, alone or in combination with the first aspect, the first parameter includes a first port identifier and the second parameter includes a second port identifier.

In a third aspect, alone or in combination with one or more of the first and second aspects, the first sidelink feedback resource is a first PRB, the second sidelink feedback resource is a second PRB that is different from and at least partially overlaps in time with the first PRB.

In a fourth aspect, alone or in combination with one or more of the first through third aspects, the first sidelink feedback resource and the second sidelink feedback resource include a single sidelink feedback resource in which the groupcast feedback and the unicast feedback are code-division multiplexed.

In a fifth aspect, alone or in combination with one or more of the first through fourth aspects, process 700 includes receiving SCI indicating that the groupcast communication and the unicast communication are superposition coded in the single sidelink subchannel.

In a sixth aspect, alone or in combination with one or more of the first through fifth aspects, the SCI includes an SCI-1 message and an SCI-2 message that are superposition coded in a sidelink control channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
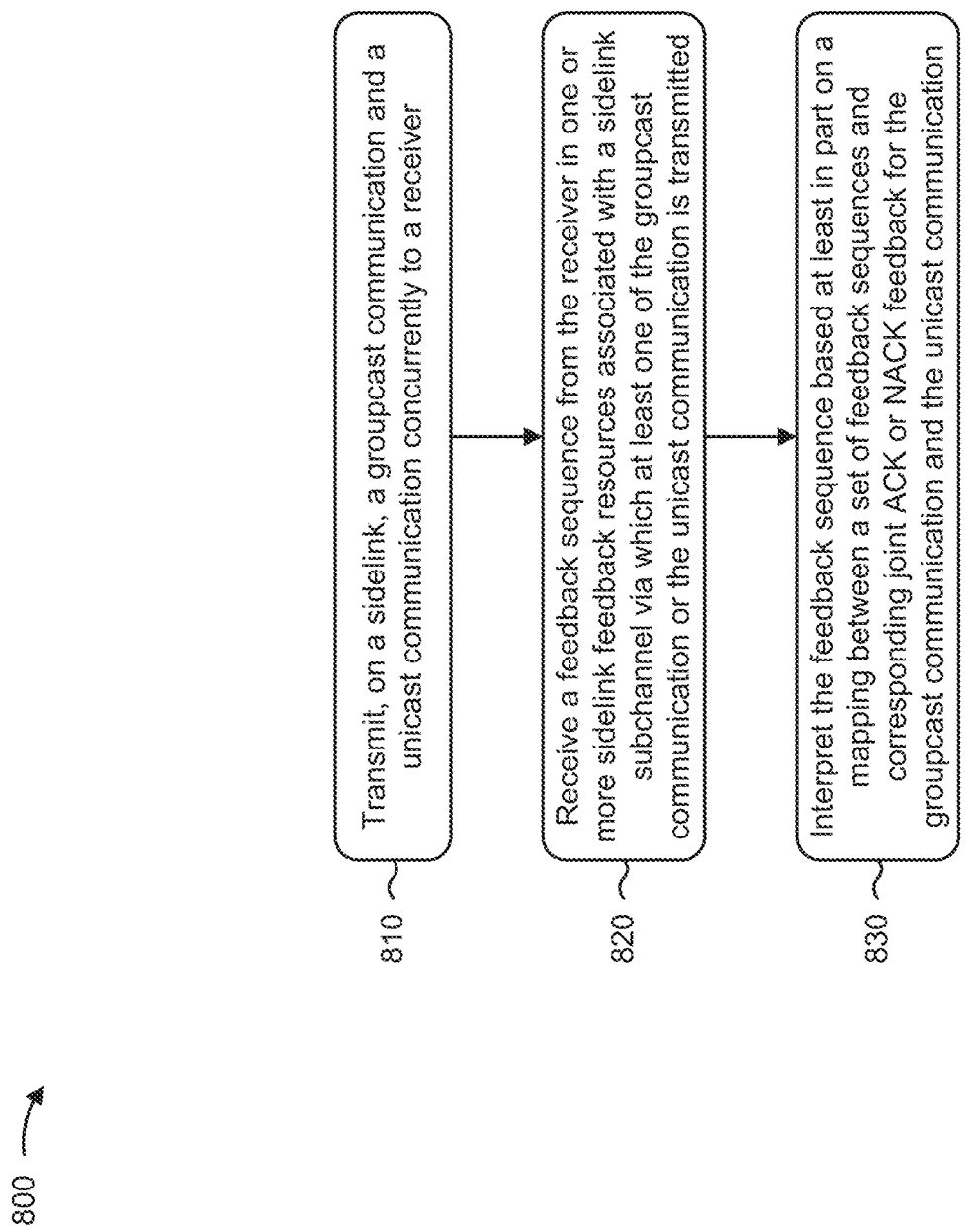

FIG. 8 is a diagram illustrating an example process 800 performed, for example, by a UE, in accordance with various aspects of the present disclosure. Example process 800 is an example where a UE (e.g., UE 120, UE 305, Tx/Rx UE 405, Rx/Tx UE 410, UE 505, and/or the like) performs operations associated with receiving MUST sidelink feedback.

As shown in FIG. 8, in some aspects, process 800 may include transmitting, on a sidelink, a groupcast communication and a unicast communication concurrently to a receiver (block 810). For example, the UE may transmit (e.g., using controller/processor 280, transmit processor 264, TX MIMO processor 266, MOD 254, antenna 252, and/or the like), on a sidelink, a groupcast communication and a unicast communication concurrently to a receiver, as described above.

As further shown in FIG. 8, in some aspects, process 800 may include receiving a feedback sequence from the receiver in one or more sidelink feedback resources associated with a sidelink subchannel via which at least one of the groupcast communication or the unicast communication is transmitted (block 820). For example, the UE may receive (e.g., using antenna 252, DEMOD 254, MIMO detector 256, receive processor 258, controller/processor 280, and/or the like) a feedback sequence from the receiver in one or more sidelink feedback resources associated with a sidelink subchannel via which at least one of the groupcast communication or the unicast communication is transmitted, as described above.

As further shown in FIG. 8, in some aspects, process 800 may include interpreting the feedback sequence based at least in part on a mapping between a set of feedback sequences and corresponding joint ACK or NACK feedback for the groupcast communication and the unicast communication (block 830). For example, the UE may interpret (e.g., using controller/processor 280 and/or the like) the feedback sequence based at least in part on a mapping between a set of feedback sequences and corresponding joint ACK or NACK feedback for the groupcast communication and the unicast communication, as described above.

Process 800 may include additional aspects, such as any single aspect or any combination of aspects described below and/or in connection with one or more other processes described elsewhere herein.

In a first aspect, the groupcast communication and the unicast communication are concurrently transmitted to the receiver in different sidelink subchannels.

In a second aspect, alone or in combination with the first aspect, the groupcast communication and the unicast communication are concurrently transmitted to the receiver in a single sidelink subchannel.

In a third aspect, alone or in combination with one or more of the first and second aspects, process 800 includes transmitting SCI indicating that the groupcast communication and the unicast communication are superposition coded in the single sidelink subchannel.

In a fourth aspect, alone or in combination with one or more of the first through third aspects, the SCI includes an SCI-1 message and an SCI-2 message that are superposition coded in a sidelink control channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
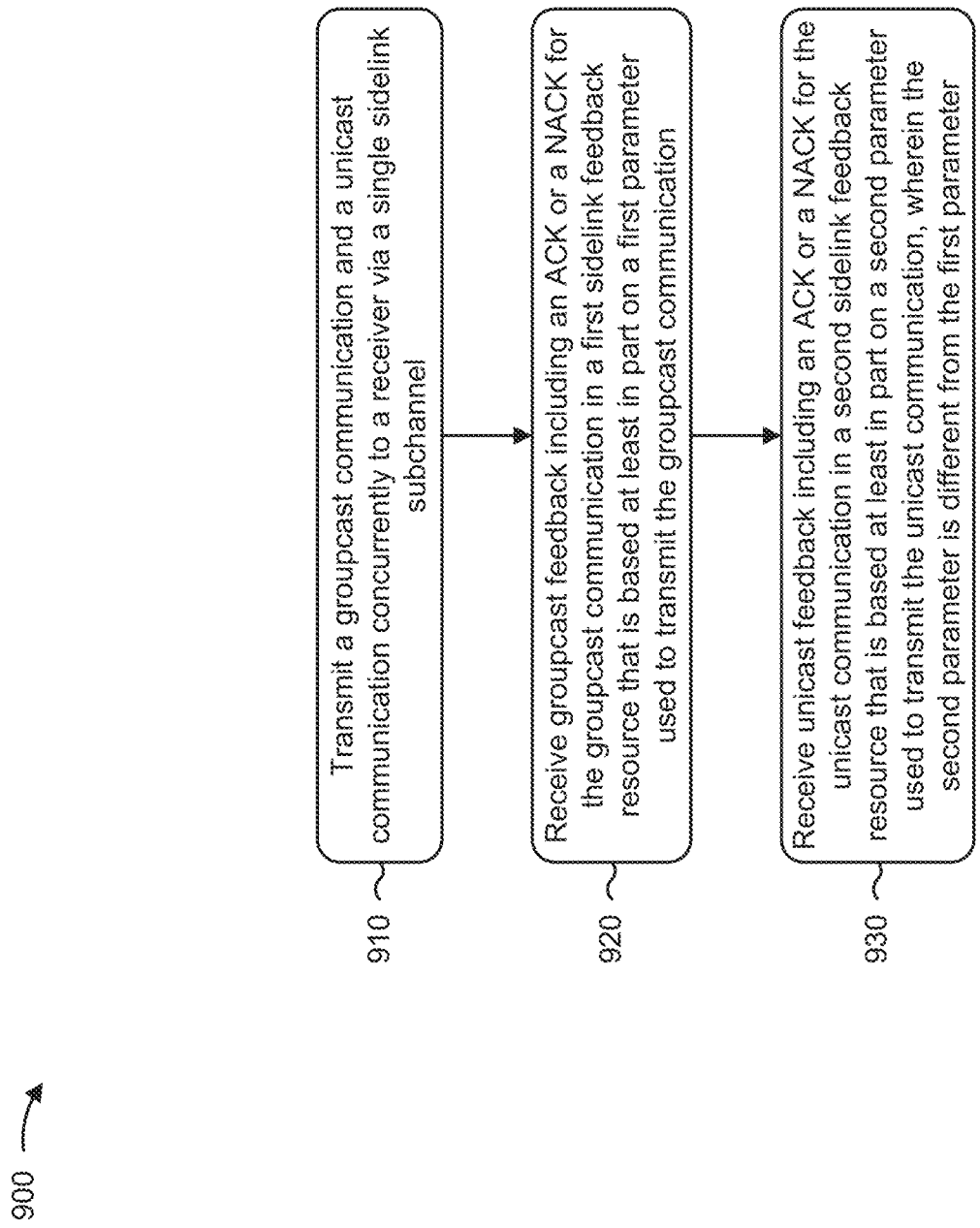

FIG. 9 is a diagram illustrating an example process 900 performed, for example, by a UE, in accordance with various aspects of the present disclosure. Example process 900 is an example where a UE (e.g., UE 120, UE 305, Tx/Rx UE 405, Rx/Tx UE 410, UE 505, and/or the like) performs operations associated with receiving MUST sidelink feedback.

As shown in FIG. 9, in some aspects, process 900 may include transmitting a groupcast communication and a unicast communication concurrently to a receiver via a single sidelink subchannel (block 910). For example, the UE may transmit (e.g., using controller/processor 280, transmit processor 264, TX MIMO processor 266, MOD 254, antenna 252, and/or the like) a groupcast communication and a unicast communication concurrently to a receiver via a single sidelink subchannel, as described above.

As further shown in FIG. 9, in some aspects, process 900 may include receiving groupcast feedback including an ACK or a NACK for the groupcast communication in a first sidelink feedback resource that is based at least in part on a first parameter used to transmit the groupcast communication (block 920). For example, the UE may receive (e.g., using antenna 252, DEMOD 254, MIMO detector 256, receive processor 258, controller/processor 280, and/or the like) groupcast feedback including an ACK or a NACK for the groupcast communication in a first sidelink feedback resource that is based at least in part on a first parameter used to transmit the groupcast communication, as described above.

As further shown in FIG. 9, in some aspects, process 900 may include receiving unicast feedback including an ACK or a NACK for the unicast communication in a second sidelink feedback resource that is based at least in part on a second parameter used to transmit the unicast communication, wherein the second parameter is different from the first parameter (block 930). For example, the UE may receive (e.g., using antenna 252, DEMOD 254, MIMO detector 256, receive processor 258, controller/processor 280, and/or the like) unicast feedback including an ACK or a NACK for the unicast communication in a second sidelink feedback resource that is based at least in part on a second parameter used to transmit the unicast communication, as described above. In some aspects, the second parameter is different from the first parameter.

Process 900 may include additional aspects, such as any single aspect or any combination of aspects described below and/or in connection with one or more other processes described elsewhere herein.

In a first aspect, process 900 includes transmitting SCI indicating that the groupcast communication and the unicast communication are superposition coded in the single sidelink subchannel.

In a second aspect, alone or in combination with the first aspect, the SCI includes an SCI-1 message and an SCI-2 message that are superposition coded in a sidelink control channel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
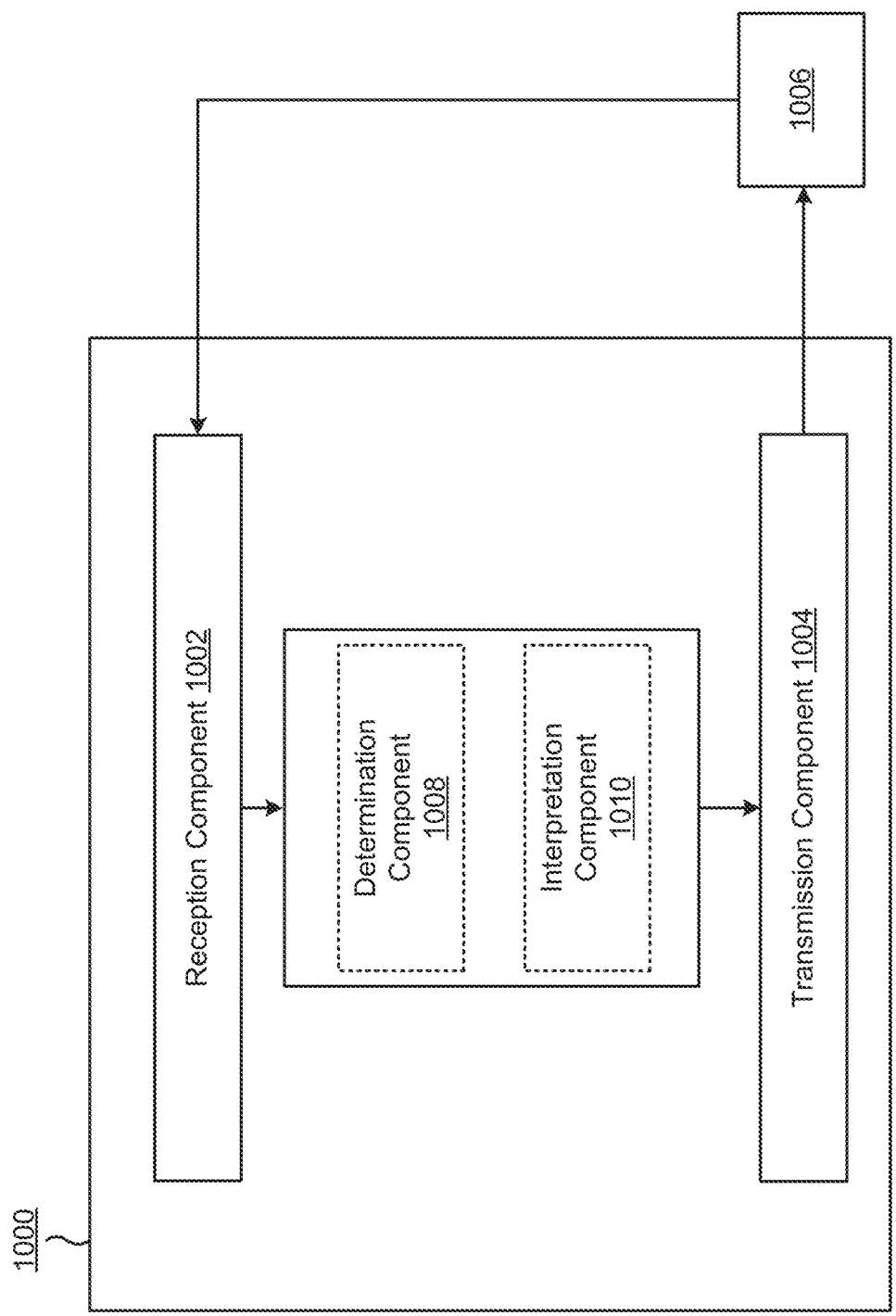
FIG. 10 is a block diagram of an example apparatus for wireless communication, in accordance with various aspects of the present disclosure.

FIG. 10 is a block diagram of an example apparatus 1000 for wireless communication. The apparatus 1000 may be a UE (e.g., UE 120, UE 305, Tx/Rx UE 405, Rx/Tx UE 410, Tx UE 505, Rx UE 510, Rx UE 512, and/or the like), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as another UE, a base station, or another wireless communication device) using the reception component 1002 and the transmission component 1004. As further shown, the apparatus 1000 may include one or more of a determination component 1008 or an interpretation component 1010, among other examples.

In some aspects, the apparatus 1000 may be configured to perform one or more operations described herein in connection with FIGS. 5A-5C. Additionally or alternatively, the apparatus 1000 may be configured to perform one or more processes described herein, such as process 600 of FIG. 6, process 700 of FIG. 7, process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive a groupcast communication and a unicast communication from the apparatus 1006. For example, the reception component 1002 may receive the groupcast communication and the unicast communication in one or more sidelink subchannels. Additionally, or alternatively, in some aspects, the reception component 1002 may receive feedback for a groupcast communication and a unicast communication from the apparatus 1006. For example, the reception component 1002 may receive a feedback sequence that indicates joint ACK and/or NACK feedback for the groupcast communication and the unicast communication, independent feedback indicates an ACK and/or NACK for the groupcast communication and the unicast communication (e.g., via separate feedback resources), and/or the like.

In some aspects, the determination component 1008 may determine, based on data received from the reception component 1002 that relates to the groupcast communication and the unicast communication, feedback to be transmitted for the groupcast communication and the unicast communication. For example, in some aspects, the feedback to be transmitted may include a feedback sequence to indicate joint feedback for the groupcast communication and the unicast communication, independent feedback to provide separate ACK or NACK feedback for the groupcast communication and the unicast communication, and/or the like. In some aspects, the determination component 1008 may include a processor (e.g., a transmit processor 220, a receive processor 238, a controller/processor 240, and/or the like).

In some aspects, the interpretation component 1010 may receive data from the reception component 1002 that relates to a feedback sequence indicating joint ACK and/or NACK feedback for a previous concurrent groupcast and unicast transmission to the apparatus 1006 and may interpret the feedback sequence based at least in part on a mapping between a set of feedback sequences and corresponding joint ACK or NACK feedback for the groupcast communication and the unicast communication. In some aspects, the interpretation component 1010 may include a processor (e.g., a transmit processor 220, a receive processor 238, a controller/processor 240, and/or the like).

In some aspects, the transmission component 1004 may transmit a communication to the apparatus 1006 based on data received from the determination component 1008, the interpretation component 1010, and/or the like. For example, the communication transmitted to the apparatus 1006 may include joint feedback and/or independent feedback for a groupcast communication and a unicast communication received from the apparatus 1006 based on the data received from determination component 1008. Additionally, or alternatively, the communication transmitted to the apparatus 1006 may include a groupcast transmission and/or a unicast transmission to the apparatus 1006. Additionally, or alternatively, the communication transmitted to the apparatus 1006 may include a retransmission of the groupcast transmission and/or the unicast transmission to the apparatus 1006 (e.g., in cases where the data received from the interpretation component 1010 includes a NACK for the groupcast transmission and/or the unicast transmission).

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, via a single sidelink subchannel, a groupcast communication and a unicast communication concurrently from a transmitter;
    determining a feedback sequence to be transmitted to indicate joint acknowledgment (ACK) or negative acknowledgement (NACK) feedback for the groupcast communication and the unicast communication based at least in part on a decoding of the groupcast communication; and
    transmitting the feedback sequence in one or more sidelink feedback resources.

2. The method of claim 1, wherein the one or more sidelink feedback resources are associated with the single sidelink subchannel.

3. The method of claim 1, further comprising:
    receiving sidelink control information (SCI) indicating that the groupcast communication and the unicast communication are superposition coded in the single sidelink subchannel.

4. The method of claim 3, wherein the SCI includes a stage one SCI message and a stage two SCI message that are superposition coded in a sidelink control channel.

5. The method of claim 1, wherein the feedback sequence to be transmitted is determined based at least in part on a cyclic shift of a base sequence.

6. The method of claim 1, wherein the feedback sequence is one of:
    a first feedback sequence if the decoding of the groupcast communication is successful and a decoding of the unicast communication is successful,
    a second feedback sequence if the decoding of the groupcast communication is successful and a decoding of the unicast communication is unsuccessful, or
    a third feedback sequence if the decoding of the groupcast communication is unsuccessful.

7. The method of claim 6, wherein the one or more sidelink feedback resources include a first sidelink feedback resource configured for ACK feedback if the feedback sequence is the first feedback sequence or the second feedback sequence, or wherein the one or more sidelink feedback resources include a second sidelink feedback resource configured for NACK feedback if the feedback sequence is the third feedback sequence.

8. The method of claim 1, wherein the one or more sidelink feedback resources are identified based at least in part on the decoding of the groupcast communication.

9. The method of claim 1, wherein the one or more sidelink feedback resources are identified based at least in part on a first port identifier used for the groupcast communication or a second port identifier used for the unicast communication.

10. The method of claim 1, wherein the one or more sidelink feedback resources include a common sidelink feedback resource for NACK-only groupcast feedback and for ACK or NACK unicast feedback.

11. The method of claim 10, further comprising:
receiving an indication of a transmit power control parameter for transmission of the ACK or NACK unicast feedback; and
transmitting the feedback sequence in the common sidelink feedback resource based at least in part on the transmit power control parameter.

12. The method of claim 1, wherein the one or more sidelink feedback resources include a first sidelink feedback resource used for NACK-only groupcast feedback and a second sidelink feedback resource used for ACK or NACK unicast feedback.

13. The method of claim 12, wherein the second sidelink feedback resource is based at least in part on the first sidelink feedback resource.

14. The method of claim 1, further comprising:
identifying a physical resource block (PRB) for the feedback sequence based on a configured mapping between the single sidelink subchannel and the PRB,
wherein the one or more sidelink feedback resources include the PRB.

15. The method of claim 1, further comprising:
selecting a groupcast feedback resource to transmit the feedback sequence,
wherein the one or more sidelink feedback resources include the groupcast feedback resource.

16. The method of claim 15,
wherein the groupcast feedback resource comprises:
a first feedback resource to transmit a groupcast ACK, and
a second feedback resource to transmit a groupcast NACK,
wherein the feedback sequence is transmitted via the first feedback resource when the feedback sequence includes the groupcast ACK and one of a unicast ACK or a unicast NACK, and
wherein the feedback sequence is transmitted via the second feedback resource when the feedback sequence includes the groupcast NACK.

17. The method of claim 1, wherein the feedback sequence indicates an ACK for the groupcast communication and a NACK for the unicast communication.

18. A method of wireless communication performed by a user equipment (UE), comprising:
receiving a groupcast communication and a unicast communication concurrently from a transmitter via a single sidelink subchannel;
transmitting groupcast feedback including an acknowledgment (ACK) or a negative acknowledgement (NACK) for the groupcast communication in a first sidelink feedback resource that is based at least in part on a first parameter used to receive the groupcast communication; and
transmitting unicast feedback including an ACK or a NACK for the unicast communication in a second sidelink feedback resource that is based at least in part on a second parameter used to receive the unicast communication, wherein the second parameter is different from the first parameter.

19. The method of claim 18, wherein the first sidelink feedback resource is determined based at least in part on the single sidelink subchannel, a transmitter identifier of the transmitter, and the first parameter, and wherein the second sidelink feedback resource is determined based at least in part on the single sidelink subchannel, the transmitter identifier, and the second parameter.

20. The method of claim 18, wherein the first parameter includes a first port identifier and the second parameter includes a second port identifier.

21. The method of claim 18, wherein the first sidelink feedback resource is a first physical resource block, and wherein the second sidelink feedback resource is a second physical resource block that is different from and at least partially overlaps in time with the first physical resource block.

22. The method of claim 18, wherein the first sidelink feedback resource and the second sidelink feedback resource include a single sidelink feedback resource in which the groupcast feedback and the unicast feedback are code-division multiplexed.

23. The method of claim 18, further comprising:
receiving sidelink control information (SCI) indicating that the groupcast communication and the unicast communication are superposition coded in the single sidelink subchannel.

24. The method of claim 23, wherein the SCI includes a stage one SCI message and a stage two SCI message that are superposition coded in a sidelink control channel.

25. A method of wireless communication performed by a user equipment, comprising:
transmitting, via a single sidelink subchannel, a groupcast communication and a unicast communication concurrently to a receiver;
receiving a feedback sequence from the receiver in one or more sidelink feedback resources; and
interpreting the feedback sequence based at least in part on a mapping between a set of feedback sequences and corresponding joint acknowledgment or negative acknowledgement feedback for the groupcast communication and the unicast communication.

26. The method of claim 25, further comprising:
transmitting sidelink control information (SCI) indicating that the groupcast communication and the unicast communication are superposition coded in the single sidelink subchannel.

27. The method of claim 26, wherein the SCI includes a stage one SCI message and a stage two SCI message that are superposition coded in a sidelink control channel.

28. A method of wireless communication performed by a user equipment, comprising:
transmitting a groupcast communication and a unicast communication concurrently to a receiver via a single sidelink subchannel;
receiving groupcast feedback including an acknowledgment (ACK) or a negative acknowledgement (NACK) for the groupcast communication in a first sidelink feedback resource that is based at least in part on a first parameter used to transmit the groupcast communication; and
receiving unicast feedback including an ACK or a NACK for the unicast communication in a second sidelink feedback resource that is based at least in part on a second parameter used to transmit the unicast communication, wherein the second parameter is different from the first parameter.

29. The method of claim 28, further comprising:
transmitting sidelink control information (SCI) indicating that the groupcast communication and the unicast communication are superposition coded in the single sidelink subchannel.

30. The method of claim 29, wherein the SCI includes a stage one SCI message and a stage two SCI message that are superposition coded in a sidelink control channel.

* * * * *